United States Patent

[11] 3,553,403

| [72] | Inventor | Samuel R. Porwancher<br>Chicago, Ill. |
|---|---|---|
| [21] | Appl. No. | 821,724 |
| [22] | Filed | May 5, 1969 |
| [45] | Patented | Jan. 5, 1971 |
| [73] | Assignee | Michigan Oven Company<br>Romulus, Mich.<br>a corporation of Michigan |

[54] AIRFLOW SAFETY SWITCH
5 Claims, 4 Drawing Figs.

| [52] | U.S. Cl. | 200/83 |
|---|---|---|
| [51] | Int. Cl. | H01h 35/34 |
| [50] | Field of Search | 200/83,<br>83.1, 81, 81.9; 73/212 |

[56] References Cited
UNITED STATES PATENTS

| 2,971,530 | 3/1961 | Dewey | 200/81X |
|---|---|---|---|
| 3,005,887 | 10/1961 | Robson | 200/81.9 |
| 3,042,769 | 8/1962 | Campbell | 200/83.6 |

*Primary Examiner*—Robert K. Schaefer
*Assistant Examiner*—M. Ginsburg
*Attorney*—Kinzer, Dorn and Zickert

ABSTRACT: An airflow safety switch, for sensing the flow of air or other gas within a duct, comprising a unitary sensing attachment for detecting both static and dynamic pressure within the duct, by means of two sensing conduits connecting to a single small opening in the duct wall, and diaphragm-actuated electrical switch means having suction and pressure chambers connected to the static and dynamic sensing conduits, respectively.

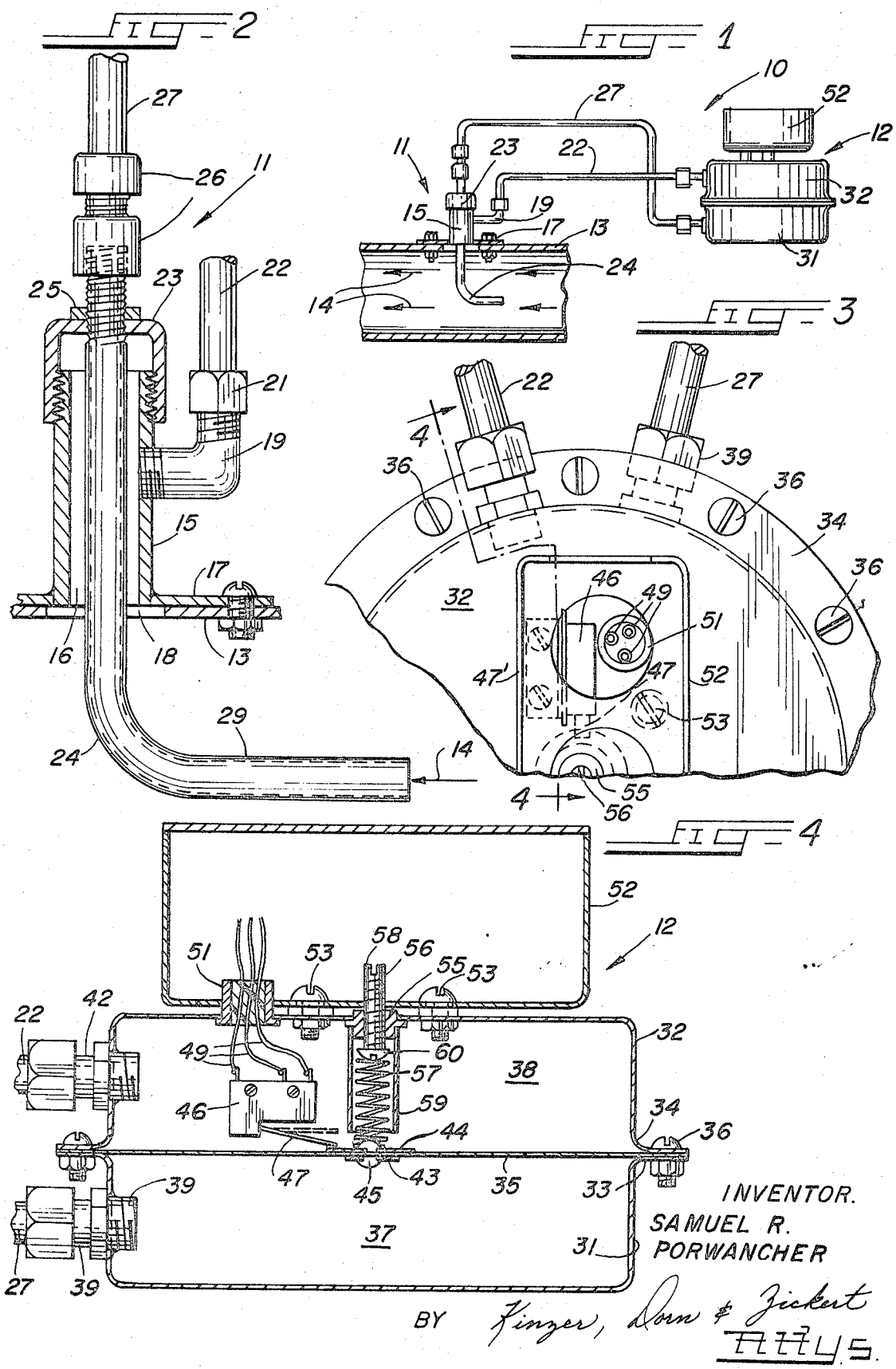

3,553,403

AIRFLOW SAFETY SWITCH

BACKGROUND OF THE INVENTION

There are a wide variety of applications utilizing a constant flow of air or other gas, in which it is essential that certain equipment be actuated or shut down in the event of an airflow failure. As one example, a drying apparatus using strip heaters may require shutdown in the event of a failure of air movement past the heaters, in order to avoid burnout. In a paint drying oven, it may be essential to shut down a conveyor, a paint applicator, or other equipment in the event of failure or marked impairment in operation of an exhaust fan. In air conditioning installations, it may be essential to replace a filter, or at least to afford a positive alarm, upon clogging of the filter. Similar situations arise in connection with heat treating ovens, kilns, pressurized rooms, and many other industrial applications.

In applications, it is often possible and practical to utilize an airflow switch actuated by a vane or other member that projects directly into the airstream. But an installation of that kind is not always convenient or practical, depending upon the nature of the air or other gas being monitored, or upon external conditions, space limitations, and other factors.

It has been conventional practice, in many installations, to utilize pressure sensing devices to monitor the air or gas flow. For example, a pressure sensing switch may be installed at the inlet end of an exhaust fan, comparing the pressure at that point in the system with atmospheric pressure. As long as a given negative pressure is maintained, it is assumed that the fan is operating properly and that an adequate airflow is being maintained. If the inlet end of the fan is inaccessible, a similar arrangement may be used at the outlet end, except that the measurement is now of positive air pressure, relative to atmospheric. In some installations, pressure sensing connections are made on both sides of a fan, and a differential comparison is made to determine whether the requisite airflow is being continued. This differential measurement is more certain than an arrangement that merely measures positive or negative pressure. Even so, pressure differentials can occur without a comparable airflow and can lead to substantial damage in systems that are dependent upon the maintenance of an adequate flow of air or other gas.

SUMMARY OF THE INVENTION

It is a principal object of the present invention to provide a new and improved airflow safety switch that effectively senses the velocity of flow of air or other gas through a duct without requiring the use of a vane or comparable moving member within the duct.

Another object of the invention is to provide a new and improved differential pressure sensing device that senses the velocity of slow of air or other gas within a duct, all from a single, unitary sensing attachment that requires only one small opening in the duct wall.

Accordingly, the invention relates to an airflow safety switch for sensing the flow of air or other gas within a duct, and comprises a static pressure sensing conduit including a cylindrical housing and means for mounting that housing in alignment with and in communication with a small opening in the duct wall. A dynamic pressure sensing conduit extends through that same housing through the same opening into the duct. Differential pressure-actuated switching means are provided, having a suction chamber and a pressure chamber separated by a flexible diaphragm and an electrical switch that is actuated by movements of the diaphragm caused by changes in the relative pressures within the chambers. The device further includes means for connecting the two sensing conduits to the chambers of the switching means to actuate the electrical switch in accordance with the velocity of airflow within the duct.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE DRAWINGS

FIG. 1 is a partially sectional elevation view of an airflow safety switch constructed in accordance with one embodiment of the present invention;

FIG. 2 is a detail sectional view, drawn to a larger scale than FIG. 1, of a pressure-sensing attachment constituting a part of the safety switch;

FIG. 3 is a partial plan view of a part of the switching means of the safety switch; and FIG. 4 is a sectional elevation view of the switching means.

DESCRIPTION OF THE PREFERRED EMBODIMENT

FIG. 1 illustrates an airflow safety switch 10 constructed in accordance with the present invention and comprising a pressure sensing attachment 11 and a pressure-actuated switching means 12. In FIG. 1, safety switch 10 is shown with the pressure sensing attachment 11 mounted upon an air duct 13 to monitor the flow of air within the duct. The direction of flow of air within the duct is indicated by arrows 14.

The construction of the pressure sensing unit 11 is best illustrated in FIG. 2. As shown therein, attachment 11 comprises a cylindrical housing 15 that is open at its bottom end 16 and that is welded or otherwise firmly fastened to a base or mounting flange 17. Flange 17 is provided with appropriate openings to permit convenient attachment of the flange to the wall of duct 13. In mounting attachment 11 on duct 13, the open end 16 of cylindrical housing 15 is aligned with a small opening 18 in the duct wall; opening 18 is about the same size as the open end of housing 15. An opening 18 of about one inch diameter, for a housing 15 having an inside diameter of five eighths inch is typical.

Housing 15, which comprises a static pressure sensing conduit, is provided with an outlet connection 19 comprising a small pipe elbow 19 that is threaded into an appropriate opening in the wall of housing 15. Outlet 19 terminates at a connector 21 that connects the elbow to a small pipe or conduit 22. Conduit 22, for example, may constitute five-sixteenths inch O.D. tubing.

The upper end of housing 15 is closed by a cap 23 that may be threaded onto or otherwise affixed to the upper end of the housing. A dynamic pressure sensing conduit 24 is threaded through an axial opening in cap 23 and is sealed in fixed position with respect to the cap by appropriate means such as a locknut 25. A coupling 26 connects the end of conduit 24 that projects beyond the cap 23 to a small pipe or tube 27. It should be noted that with attachment 11 mounted in operational position on duct 13, the dynamic pressure sensing conduit 24 extends through the opening 18 in the duct wall and into the central portion of the duct. Furthermore the inner end 29 of conduit 24 is bent at an angle of approximately 90° to facilitate alignment of the dynamic pressure conduit with or against the direction of flow of air or other gas within duct 13.

The pressure actuated switch unit 12 comprises two rigid housing members 31 and 32 having mating peripheral flanges 33 and 34. The two housing members 31 and 32 are mounted together, with a flexible, impermeable diaphragm 35 extending between them, by means of a plurality of bolts 36 clamping the two flanges 33 and 34 together around the periphery of the switching unit. Diaphragm 35 can be formed of brass or other suitable metal, but preferably is fabricated from a more elastic material, such as the silicone elastomers sometimes referred to as "silicone rubber." It is thus seen that housing members 31 and 32 and diaphragm 35 provide two separate chambers, a pressure chamber 37 and a suction chamber 38.

A fitting 39 is mounted in one wall of housing member 31 and is utilized to connect pressure chamber 37 to the conduit 27 from sensing unit 11. Similarly, a fitting 42 is mounted in one wall of housing member 32 and is employed to connect suction chamber 38 to the conduit 22 from sensing unit 11 (see FIG. 1).

A pair of stiffening washers 43 and 44 are mounted in the center of diaphragm 35 by appropriate means such as a rivet 45. A miniature electrical switch 46 is mounted on a bracket 47' (see FIG. 3), within suction chamber 38. Switch 46 has an actuating arm 47 that engages the washer 44 on the suction chamber side of diaphragm 35. The electrical connections to switch 46, represented by three wires 49, are brought out from chamber 38 through a sealed bushing 51 into a junction box 52 that is mounted on the top of switching device 12 by appropriate means such as a couple of bolts 53.

Switching unit 12 is provided with an adjustment for varying the pressure differential at which switch 46 is actuated. The adjustment means comprises a bushing 55 that is mounted in the upper central wall of housing member 32. An adjusting screw 56, having a slotted end 58, is threaded to through a central opening in bushing 55. A biasing spring 57 engages the head 60 of screw 56, which is located within the interior of the switching unit housing. The other end of spring 57 engages the washer 44 in the center of diaphragm 35. A sleeve 59 is affixed to bushing 55 and is disposed in encompassing relation to spring 57. Sleeve 59 serves a dual purpose; it guides spring 57 and maintains the spring in alignment between adjusting screw 56 and diaphragm 35, and also affords a positive stop for upward movement of the diaphragm.

In operation, the airflow safety switch 10 is mounted on duct 13 in the manner shown in FIG. 1. The dynamic or impact pressure sensing conduit 24 is aligned on the duct with its extension portion 29 facing into the airflow indicated by arrows 14. The connecting tube 27 from the dynamic pressure sensing conduit 24 is connected to the pressure chamber 37 in switching unit 12. The static pressure conduit comprising housing 15 is connected, by tube 22, to the suction chamber 38 in switch unit 12.

As long as there is a substantial flow of air in conduit 13, the pressure developed in chamber 37 through the connection to the dynamic pressure conduit 24 exceeds the static pressure in suction chamber 38, as derived from sensing conduit 15. Accordingly, diaphragm 35 is bulged upwardly against the bias of spring 57 and actuates the miniature switch 46, opening and closing switch contacts (not shown) connected to electrical conductors 49 to signal that the airflow velocity is adequate in duct 13. Velocity changes of very short duration do not allow switch 46 to dropout, there being some inertia in the system.

If the airflow in duct 13 is materially reduced in velocity or is shutoff, the pressure in chamber 37 of switch unit 12 is reduced and approaches or even reaches the static pressure in chamber 38. Under these circumstances, diaphragm 35 is moved back to its original position, as shown in FIG. 4, by spring 57. Movement of the diaphragm frees switch arm 47, and switch 46 is thus actuated to a second condition that affords an electrical signal, at conductors 49, indicating an unsafe airflow condition. Of course, if the air flow is restored to a safe level, switch 46 is again actuated as diaphragm 35 is driven upwardly by the increase in pressure in chamber 37.

To adjust the pressure differential at which switch 46 is actuated, adjustment screw 56 can be moved upwardly or downwardly in bushing 55. In this manner, the position of spring 57 is changed to adjust the pressure differential required for switch actuation. The velocity of the airflow in the duct is a direct function of the pressure differential sensed by conduits 15 and 24; accordingly, adjustment of screw 56 effectively adjusts the device for actuation at different air flow velocities. A typical operational range may include 1,000 to 10,000 feet per minute.

In operation, it is important to note that there is no moving member interposed in duct 13. The airflow in the duct does not extend into sensing unit 12 and little or no gas from the duct enters the sensing unit. The pressure differential being measured occurs only when there is an actual flow of air in duct 13, since both of the sensing conduits are located in the same part of duct 13; consequently, it is not possible to have a false indication of an adequate air flow result from a static pressure differential. A true measure of the velocity of the airflow is obtained and this the basis for actuation of control switch 46.

In use of the invention, only a minimal modification is required in duct 13. In most installations, a single one-inch hole in the duct wall is adequate to permit mounting of the pressure sensing attachment on the duct. There is no critical mounting requirement for switch unit 12. The complete installation can be effected in minimal time by a sheet metal worker without requiring any special skill or aptitude for the installation.

I claim:

1. An airflow safety switch for sensing the flow of air or other gas within a duct, comprising:
    a static pressure sensing conduit comprising a cylindrical housing and means for mounting said housing in alignment and in communication with an opening in a duct wall;
    a dynamic pressure sensing conduit extending from said housing for projecting through said opening into said duct;
    differential pressure-actuated switching means, including a suction chamber and a pressure chamber separated by a flexible diaphragm, and including an electrical switch actuated by movements of said diaphragm; and
    means for connecting said sensing conduits to said pressure chambers to actuate said electrical switch in accordance with the velocity of airflow within the duct.

2. An airflow safety switch according to claim 1 in which said dynamic pressure sensing conduit is adapted to project into said duct transversely of the airflow and terminate in an inner end bent to face into the flow of air in the duct.

3. An airflow safety switch according to claim 1 in which said electrical switch is mounted within said suction chamber.

4. An airflow safety switch according to claim 1 and further comprising a compression biasing spring, disposed within said suction chamber, biasing said diaphragm toward a normal position indicative of minimal velocity of airflow within the duct, and means for adjusting the biasing force of said spring.

5. An airflow safety switch according to claim 4 and further comprising a guide tube encompassing said biasing spring said tube affording a guide for movements of the spring and also affording a positive stop to prevent damage to said electrical switch under excess velocity conditions.